United States Patent [19]

Gudmundson

[11] Patent Number: 5,341,397
[45] Date of Patent: Aug. 23, 1994

[54] CDMA FREQUENCY ALLOCATION

[75] Inventor: Bjorn Gudmundson, Sollentuna, Sweden

[73] Assignee: Telefonaktiebolaget L M Ericsson, Stockholm, Sweden

[21] Appl. No.: 162,948

[22] Filed: Dec. 8, 1993

Related U.S. Application Data

[62] Division of Ser. No. 868,038, Apr. 13, 1992, Pat. No. 5,295,153.

[51] Int. Cl.$^5$ .................. H04B 7/216; H04B 1/76
[52] U.S. Cl. .................................. 375/1; 455/68
[58] Field of Search .......................... 375/1; 455/68

[56] References Cited

U.S. PATENT DOCUMENTS

| | | |
|---|---|---|
| 3,740,538 | 6/1973 | Hemphill . |
| 4,134,071 | 1/1979 | Ohnsorge . |
| 4,470,138 | 9/1984 | Gutleber . |
| 4,567,572 | 1/1986 | Morris et al. . |
| 4,644,560 | 2/1987 | Torre et al. . |
| 4,783,780 | 11/1988 | Alexis . |
| 4,839,844 | 6/1989 | Watari . |
| 4,850,033 | 7/1989 | Eizenhöfer et al. . |
| 4,901,307 | 2/1990 | Gilhousen et al. . |
| 4,903,005 | 2/1990 | Sakashita et al. . |
| 4,930,140 | 5/1990 | Cripps et al. . |
| 4,965,850 | 10/1990 | Scholemer . |
| 4,984,247 | 1/1991 | Kaufmann et al. . |
| 5,022,049 | 6/1991 | Abrahamson et al. . |
| 5,038,399 | 8/1991 | Bruckert . |
| 5,048,059 | 9/1991 | Dent . |
| 5,056,109 | 10/1991 | Gilhousen . |
| 5,091,942 | 2/1992 | Dent . |
| 5,101,501 | 3/1992 | Gilhousen . |
| 5,103,459 | 4/1992 | Gilhousen . |
| 5,109,390 | 4/1992 | Gilhousen . |
| 5,151,919 | 9/1992 | Dent . |
| 5,164,958 | 11/1992 | Omura . |
| 5,187,675 | 2/1993 | Dent et al. . |
| 5,218,619 | 6/1993 | Dent . |
| 5,237,586 | 8/1993 | Bottomley . |
| 5,239,557 | 8/1993 | Dent . |

FOREIGN PATENT DOCUMENTS 470831  2/1992  European Pat. Off. .

OTHER PUBLICATIONS

A. Snijders, "Inleiding Schakeltechniek", course L 89, Note pp. 13–18 to 13–24, Delft University of Technology, (1981).
A. Kerdock, "A Class of Low–Rate Nnolinear Binary Codes", Information and Control, vol. 20, pp. 182–187 (1972).
F. MacWilliams, *The Theory of Error–Correcting Codes,* Part I and II, New York: North–Holland, 1977, pp. 93–124, 451–465.

(List continued on next page.)

*Primary Examiner*—Gilberto Barrón, Jr.
*Attorney, Agent, or Firm*—Burns, Doane, Swecker & Mathis

[57] ABSTRACT

A Code Division Multiple Access (CDMA) communication system which allocates different sets of frequencies to cells with different transmission power levels. Based upon the transmission power levels of a base station for each cell, each base station is assigned to one of at least two groups of base stations. Each group of base stations is assigned a set of frequencies for traffic communication. The set of frequencies assigned to one group of base stations does not overlap with the set of frequencies assigned to a different group of base stations.

7 Claims, 9 Drawing Sheets

OTHER PUBLICATIONS

Y. Geadah et al., "Natural, Dyadic, and Sequency Order Algorithms and Processors for the Walsh–Hadamard Transform", IEEE Trans. on Computers, vol. C-26, No. 5, May 1977.

A. Viterbi, "Very Low Rate Convolutional Codes for Maximum Theoretical Performance of Spread-Spectrum Multiple-Access Channels" IEEE Journal on Selected Areas in Communications, vol. 8, No. 4, May 1990.

K. Gilhousen et al., "On The Capacity of a Cellular CDMA System", IEEE Trans. on Vehicular Technology, vol. 40, No. 2, May 1991.

R. Kohno et al., "Adaptive Cancellation of Interference in Direct-Sequence Spread-Spectrum Multiple Access Systems", Proceedings IEEE Global Telecommunications Conference, vol. 1, pp. 630–634 (Nov. 15, 1987).

T. Masamura, "Spread Spectrum Multiple Access System with Intrasystem Interference Cancellation", Trans. of the Institute of Electronics and Communication Engineers of Japan, Section E71, No. 3, pp. 224–231 (Mar. 1, 1988).

M. K. Varanasi et al., "An Iteractive Detector for Asynchronous Spread-Spectrum Multiple-Access Systems", Proceeding IEEE Global Telecommunications Conference, vol. 1, pp. 556–560 (Nov. 28, 1988).

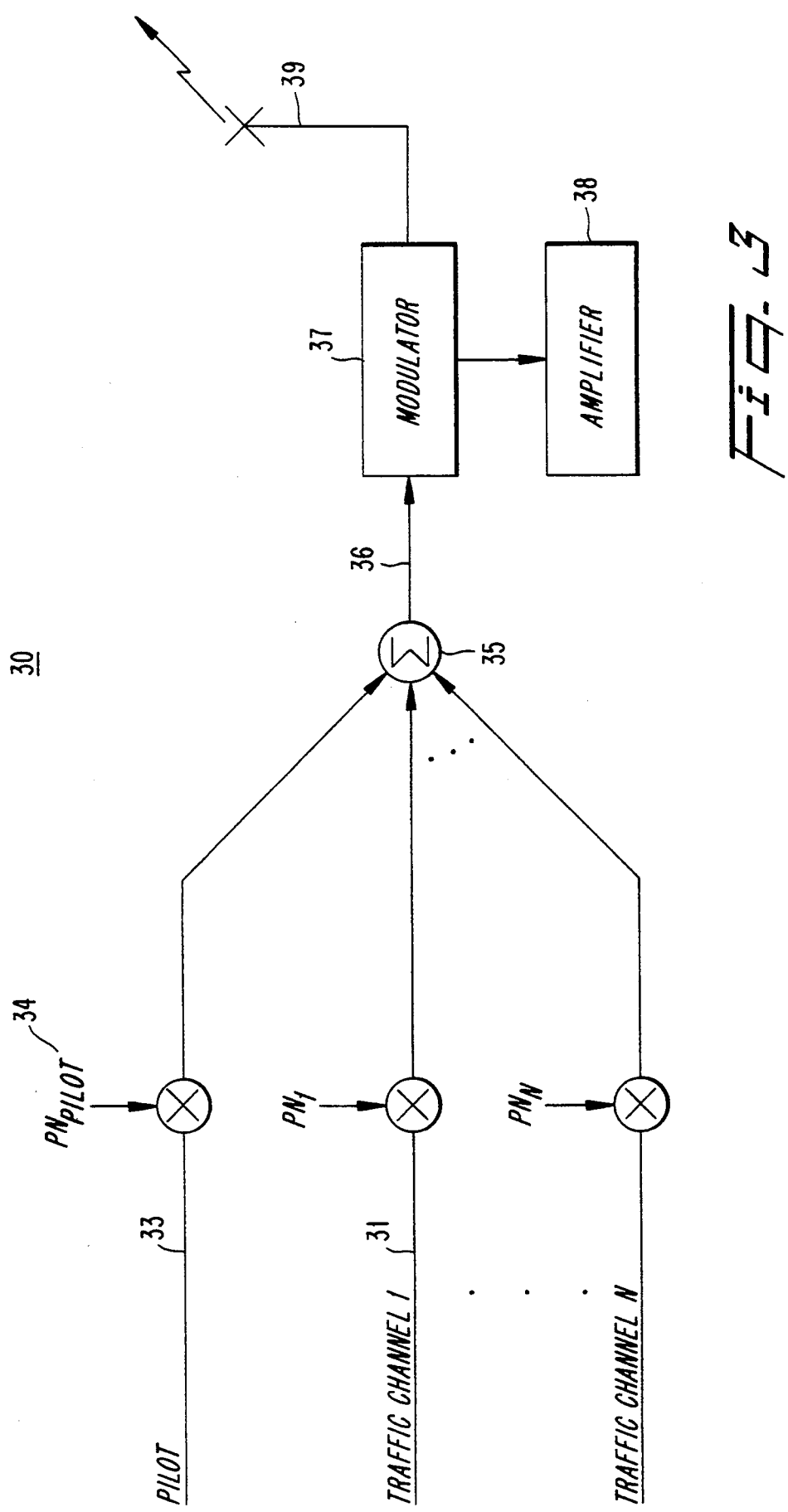

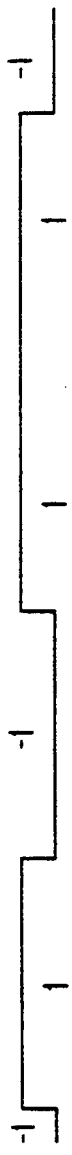
Fig. 4(a) DATASTREAM FOR SIGNAL 1:
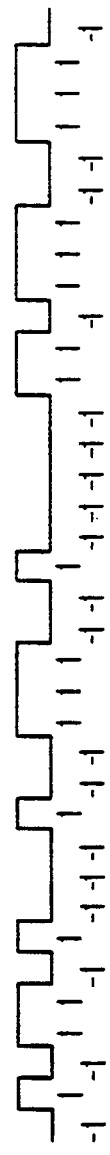
Fig. 4(b) CODE FOR SIGNAL 1:
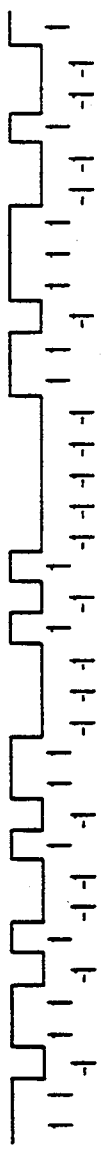
Fig. 4(c) PRODUCT OF SIGNAL 1 AND CODE 1:
Fig. 4(d) DATASTREAM FOR SIGNAL 2:
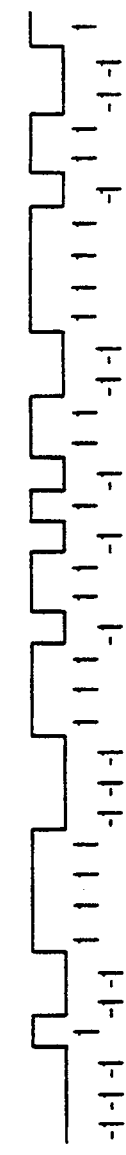
Fig. 4(e) CODE FOR SIGNAL 2:
Fig. 4(f) PRODUCT OF SIGNAL 2 AND CODE 2:

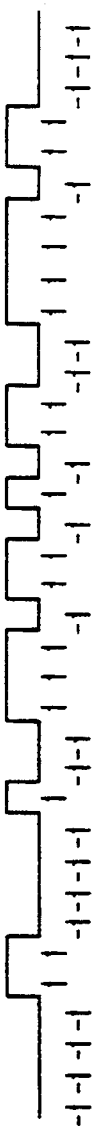
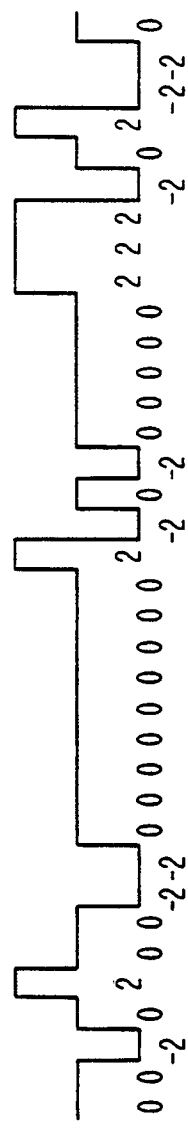
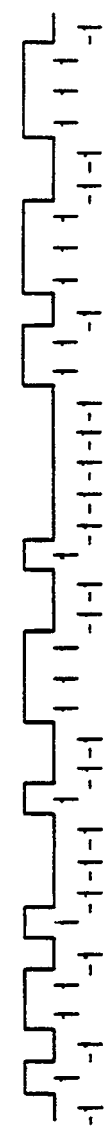
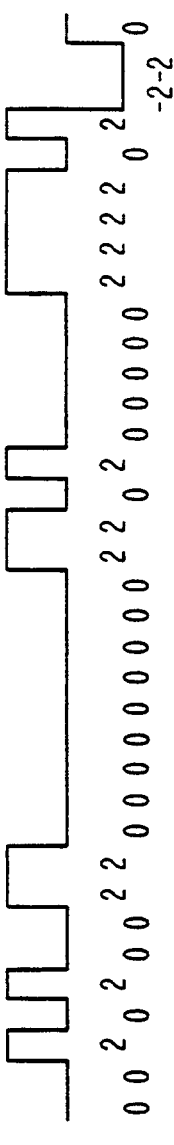
Fig. 5(a) PRODUCT OF SIGNAL 1 AND CODE 1.
Fig. 5(b) PRODUCT OF SIGNAL 2 AND CODE 2.
Fig. 5(c) SUM OF CODED SIGNALS 1 AND 2.
Fig. 5(d) CODE FOR SIGNAL 1.
Fig. 5(e) PRODUCT OF SUM WITH SIGNAL 1'S CODE
Fig. 5(f)

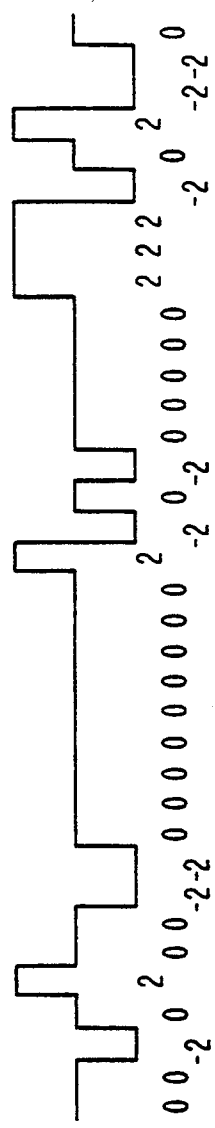
Fig. 6(a) SUM OF CODED SIGNALS 1 AND 2.
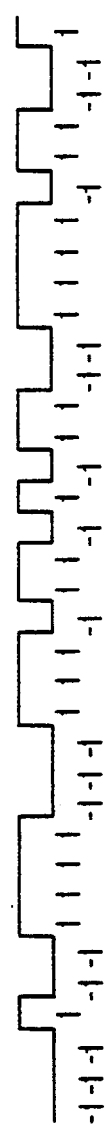
Fig. 6(b) CODE FOR SIGNAL 2.
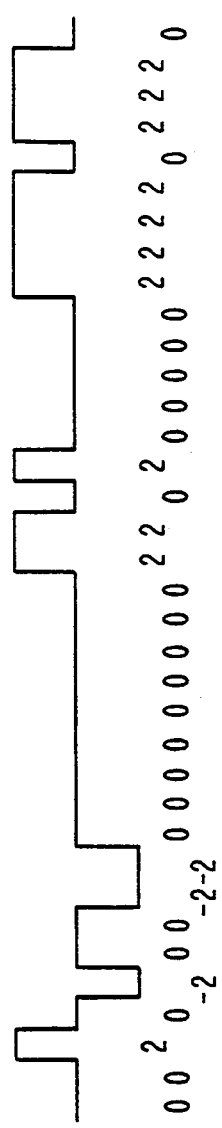
Fig. 6(c) PRODUCT OF SUM WITH SIGNAL 2'S CODE.
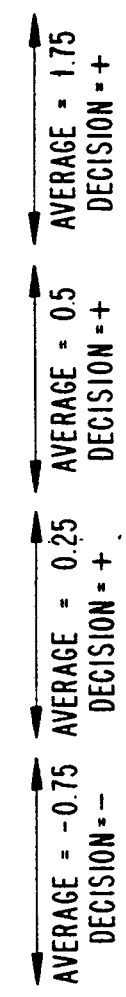
Fig. 6(d)

Fig. 7(a) RECONSTRUCTED DATASTREAM FOR SIGNAL 2

Fig. 7(b) CODE FOR SIGNAL 2

Fig. 7(c) RECONSTRUCTED CODED SIGNAL 2

Fig. 7(d) RECEIVED COMPOSITE SIGNAL

Fig. 7(e) RESIDUAL OF SUM SIGNAL MINUS RECONSTRUCTED CODED SIGNAL 2

Fig. 7(f) PRODUCT OF SUBTRACTIVE RESIDUAL AND SIGNAL 1'S CODE

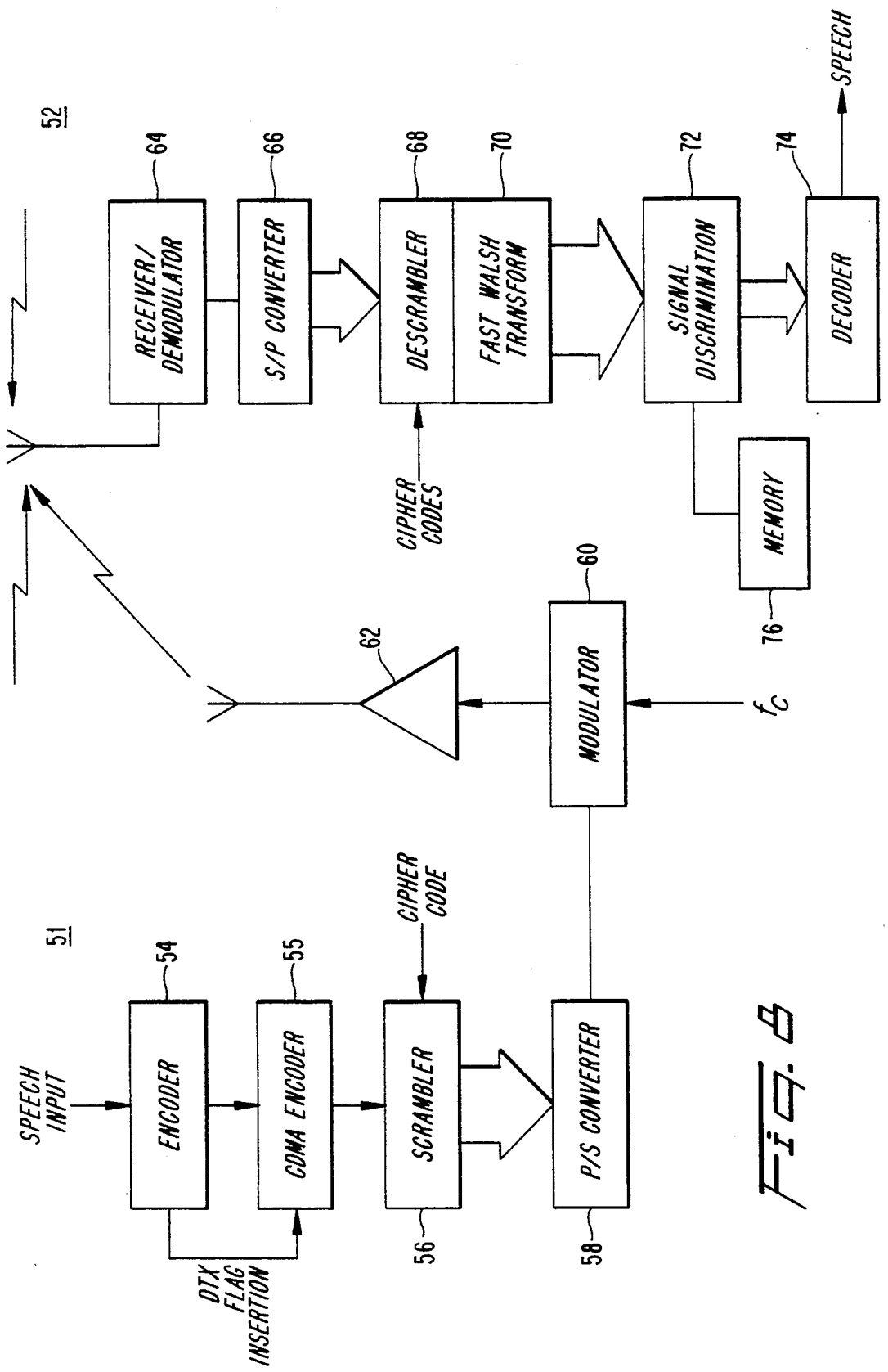

CDMA FREQUENCY ALLOCATION

This application is a divisional, of application Ser. No. 07/868,038 filed Apr. 13, 1992 now U.S. Pat. No. 5,295,153.

FIELD OF THE INVENTION

The present invention relates to the use of Code Division Multiple Access (CDMA) communications techniques used in cellular radio telephone communication systems, and more particularly, to the allocation of frequencies to cells with different transmission power levels in a CDMA communication system.

BACKGROUND OF THE INVENTION

The cellular telephone industry has made phenomenal strides in commercial operations in the United States as well as the rest of the world. Growth in major metropolitan areas has far exceeded expectations and is outstripping system capacity. If this trend continues, the effects of rapid growth will soon reach even the smallest markets. Innovative solutions are required to meet these increasing capacity needs as well as to maintain high quality service and avoid rising prices.

Throughout the world, one important step in cellular systems is to change from analog to digital transmissions. Equally important is the choice of an effective digital transmission scheme for implementing the next generation of cellular technology. Furthermore, it is widely believed that the first generation of personal communication networks (PCN) (employing low cost, pocket-sized, cordless telephones that can be carried comfortably and used to make and receive calls in the home, office, street, car, etc.), would be provided by the cellular carriers using the next generation digital cellular system infrastructure and the cellular frequencies. The key feature demanded in these new systems is increased traffic capacity.

Currently, channel access is achieved using frequency division multiple access (FDMA) and time division multiple access (TDMA) methods. In FDMA, a communication channel is a single radio frequency band into which a signals transmission power is concentrated. Interference with adjacent channels is limited by the use of bandpass filters which only pass signal energy within the specified frequency band. Thus, with each channel being assigned a different frequency, system capacity is limited by the available frequencies as well as by limitations imposed by channel radios.

In TDMA systems, a channel consists of a time slot in a period train of time intervals over the same frequency. Each period of time slots is called a frame. A given signal's energy is confined to one of these time slots. Adjacent channel interference is limited by the use of a time gate or other synchronization element that only passes signal energy received at the proper time. Thus, the portion of the interference from different relative signal strength levels is reduced.

Capacity in a TDMA system is increased by compressing the transmission signal into a shorter time slot. As a result, the information must be transmitted at a correspondingly faster bit rate which increases the amount of occupied spectrum proportionally.

With FDMA or TDMA systems, or a hybrid FDMA/TDMA system, the goal is to ensure that two potentially interfering signals do not occupy the same frequency at the same time. In contrast, CDMA allows signals to overlap in both time and frequency. Thus, all CDMA signals share the same frequency spectrum. In either the frequency or the time domain, the multiple access signals appear to be on top of each other.

In principle, the information data stream to be transmitted is first coded or spread and then combined with a long PN-sequence or a shorter scrambling-sequence. In the latter case, the scrambling-sequences are planned from cell to cell so that neighboring cells use different scrambling-sequences or scrambling-masks. The information data stream and the PN-sequence or the scrambling sequence can have the same or different bit rates. The informational data stream and the PN-sequence or the scrambling-sequence are combined by multiplying the two bit streams together. Each information data stream or channel is allocated a unique spreading code. A plurality of coded information signals are transmitted on radio frequency carrier waves and jointly received as a composite signal at a receiver. Each of the coded signals overlaps all of the other coded signals, as well as noise related signals, in both frequency and time. By correlating the composite signal with one of the unique codes, a corresponding information signal is isolated and decoded.

There are a number of advantages associated with CDMA communication techniques. The capacity limits of CDMA based cellular systems are projected to be up to 20 times that of existing analog technology as a result of the properties of a wideband CDMA system, such as improved coding gain/modulation density, voice activating gating, sectorization and reuse of the same spectrum in every cell. CDMA transmission of voice by a high bit rate decoder ensures superior, realistic voice quality. CDMA also provides for variable data rates allowing many different grades of voice quality to be offered. The scrambled signal format of CDMA completely eliminates cross-talk and makes it very difficult and costly to eavesdrop or track calls, ensuring greater privacy to callers and greater immunity from air-time fraud.

Despite the numerous advantages offered by CDMA, problems can occur when the CDMA system contains different size cells which have different power levels. One problem is how to allocate frequencies between the different types of cells. While this problem can be easily handed in traditional FDMA or TDMA systems, the problem is quite serious in CDMA systems because all of the frequencies are used throughout the system. This problem occurs, for example, when microcells are used within umbrella cells and at the border between urban and rural areas where different size cells are used. The general problem is that the uplink (from mobile station to base station) and downlink (from base station to mobile station) handoff points are not located at the same place. The downlink handoff point is located closer to the microcell than the uplink handoff point.

FIG. 1 illustrates a typical scenario of the use of microcells within umbrella cells. An umbrella cell 10 contains a base station 12 and a plurality of microcells 14. Each microcell 14 contains a base station 16. In this example, a mobile station 18 is located near the umbrella base station 12 but is located in a microcell 14. The base station for an umbrella cell 10 generally operates at a power level which is much higher than the power level used for base stations of a microcell. Since the mobile station is located in the microcell 14 and is in communication with the base station 16, the high powered signals from the umbrella base station 12 may interfere with the communications between the mobile station 18 and the microcell base station 16. Since the umbrella base station is operating at a high power level, the interfering signals can easily be 10-20 decibels above the communication signal between the mobile station and the microcell base station. Even if the processing gain of the CDMA system is large enough to handle such interfering signals, the capacity of the system will be decreased. Furthermore, if the mobile station 18 were to connect to the umbrella cell base station 12, the mobile station 18 would have to increase its power which would interfere with the microcell base station 16 in the uplink direction.

FIG. 2 illustrates the problems that can occur around the border between small (urban) and large (rural) cells. A rural cell 20 contains a base station 22 and an urban cell 24 contains a base station 26. In this example, a mobile station is located near the border between the urban cell 24 and the rural cell 20. When the mobile station is moving in the direction of the arrow A, the question becomes to which cell does the mobile station belong. If the mobile station is connected to the base station 26 in the urban cell 24, the mobile station may encounter an interference from the signals from the rural base station 22 due to the different power levels between the rural and urban base stations. If the mobile station is connected to the base station 22 in the rural cell 20, the mobile station will have to increase the power of its own transmission in order to adequately communicate with the base station 22. As a result, the mobile station's transmission will interfere with the reception of the base station 26 since the mobile station is closer to that base station.

SUMMARY OF THE INVENTION

The present invention overcomes the above-mentioned problems by allocating different frequencies or sets of frequencies to cells with different transmission power levels. For example, umbrella cells are assigned one set of frequencies to operate on, while microcells are assigned a different set of frequencies to operate on. The sets of frequencies should be sufficiently separated in order to decrease interference between different cells.

In order to allow the communication system to use Mobile Assisted Handoff (MAHO), the present invention includes several other features. In one embodiment of the present invention, all base stations in the communication system transmit a known pilot-sequence. Each base station transmits a pilot-sequence on each of the frequencies assigned to the particular base station as well as some or all of the other frequencies used in the communication system which are not assigned to that particular base station.

Since the pilot-sequence signals will be received at each mobile station along with other signals containing speech information and noise, each mobile station will have to use a subtractive demodulation process to sort through all of the received signals to detect and decode the desired signals. Using the subtractive demodulation process, a mobile station can detect and decode the information signals being sent to that particular mobile station as well as detect and decode the pilot-sequence signals broadcast from various base stations in the communication system. As a result, each mobile station can receive its own signal on its own frequency and simultaneously measure the signal strength of the neighboring base stations by measuring the signal strength of their pilot-sequences which are being broadcasted on the same frequency.

In another embodiment of the present invention, the present invention takes advantage of discontinuous transmission (DTX) and discontinuous reception (DRX) to measure the signal strength of neighboring base stations. It is well known that the capacity of a DS-CDMA system can be approximately doubled if a transmission occurs only when there is information to be transmitted. In other words the transmitter is turned off during a pause in speech. If the transmitter before being turned off transmits a message which tells the receiver that the transmission will be discontinued for a certain period of time, the receiver can use the rest of the time period to measure signal strengths of other signals on other frequencies. As a result, a mobile station can measure the signal strength of other base stations.

BRIEF DESCRIPTION OF THE DRAWINGS

The present invention will now be described in more detail with reference to the preferred embodiments of the invention, giving only by way of example and illustrated in the accompanying drawings in which:

FIG. 3 illustrates a base station with a pilot-sequence signal in one embodiment of the present invention;

FIGS. 4(a) through 4(f) show a series of graphs illustrating how CDMA signals are generated;

FIGS. 5(a) through 5(f) and 6(a) through 6(f) show a series of graphs for illustrating how CDMA signals are decoded;

FIGS. 7(a) through 7(f) show a series of graphs illustrating CDMA subtractive demodulation according to one embodiment of the present invention;

FIG. 8 illustrates a block diagram of a CDMA communications system of a type in which the present invention can be advantageously employed;

DETAILED DESCRIPTION OF THE PREFERRED EMBODIMENTS

Figure 1:
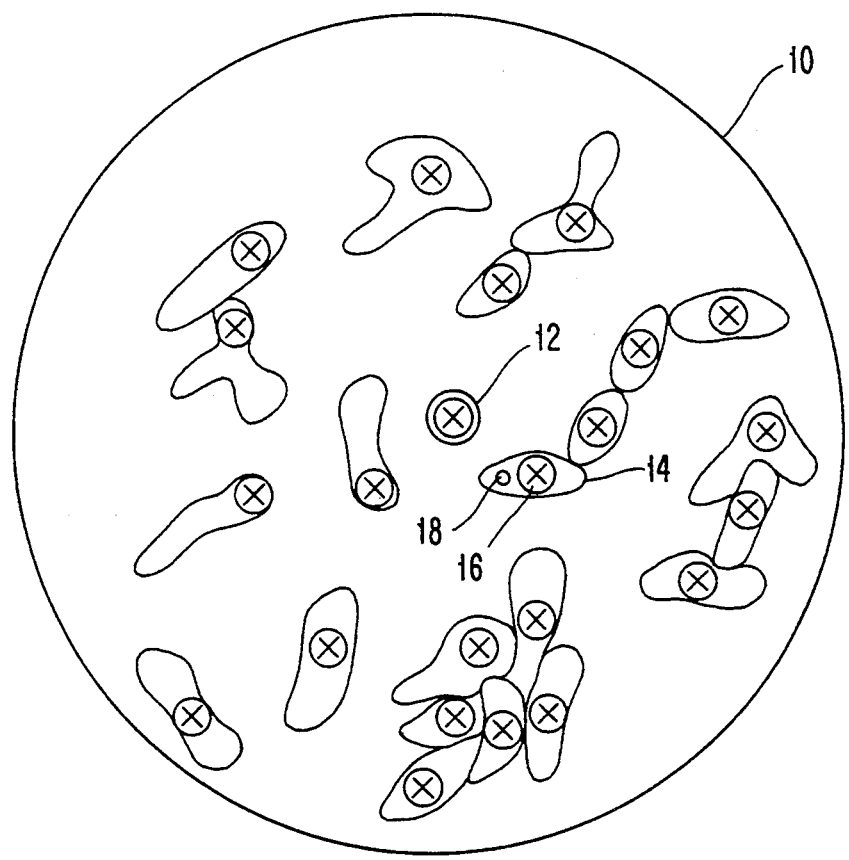
FIG. 1 illustrates a typical arrangement of umbrella cells in microcells.
Figure 2:
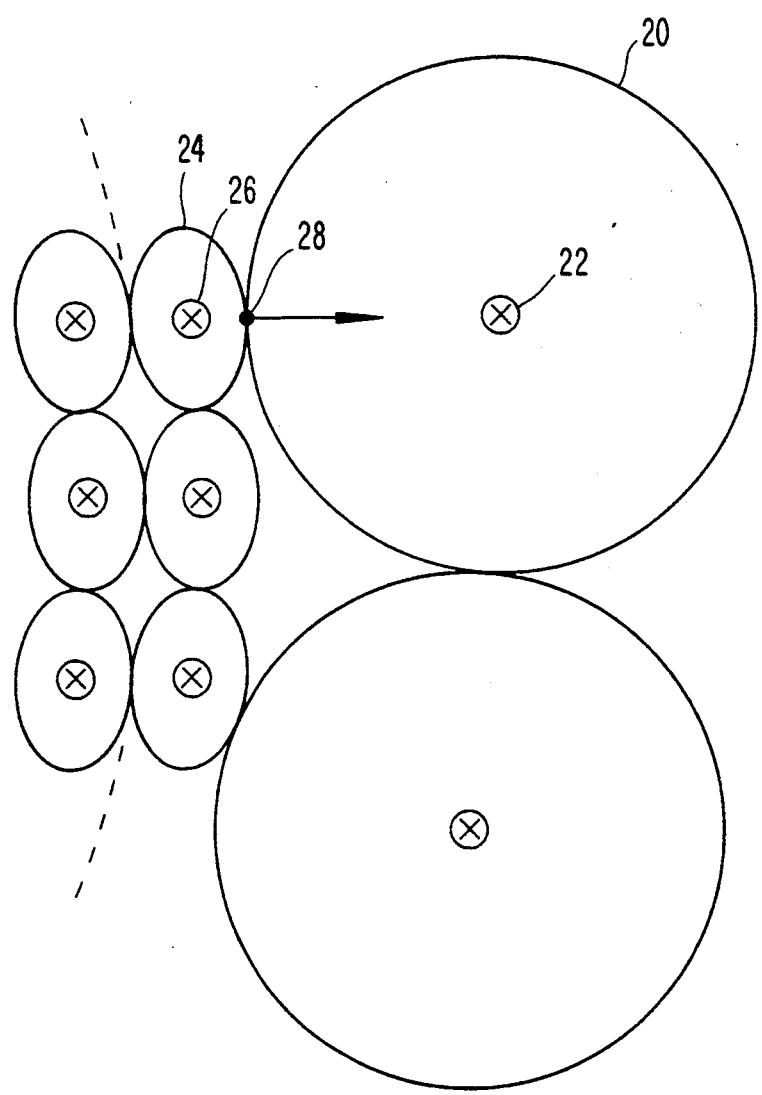
FIG. 2 illustrates a communication system with rural and urban cells.

While the following description is in the context of cellular communication systems involving portable or mobile radio telephones and/or personal communication networks, it will be understood by those of ordinary skill in the art that the present invention may be applied to other communication applications.

In the present invention, different sets of frequencies are assigned to cells with different transmission power levels. For example, microcells can be assigned a set of frequencies which is different from the set of frequencies assigned to an umbrella cell. Furthermore, the different sets of frequencies should be separated by a frequency band which is large enough to decrease interference in the system. As a result, the interference caused by the powerful signals generated in the umbrella cell will be decreased since the mobiles operating in the microcells within the umbrella cell will be using frequencies that are different from the frequencies used by the umbrella cell.

However, assigning different sets of frequencies to different types of cells has a drawback in that Mobile Assisted Handoff (MAHO) is not possible. Mobile Assisted Handoff is not possible since mobiles are continuously receiving signals on their own frequency so they are unable to simultaneously measure the signal strength of other signals on other frequencies.

In one embodiment of the present invention, all of the base stations in the communication system transmit a known pilot-sequence. The pilot-sequence is transmitted just like any other type of channel, i.e., a traffic channel. However, the pilot sequence may contain no information or a limited amount of information. The pilot-sequence is only transmitted in the downlink direction. Each base station transmits a pilot-sequence on each of the frequencies assigned to that particular base station as well as on some or all of the frequencies that are not assigned to that particular base station. If the frequency has been assigned to the base station, the corresponding pilot-sequence is transmitted with slightly more power than the other channels in the base station. When the base station is transmitting a pilot-sequence on a frequency that has not been assigned to the base station, the base station just transmits the pilot-sequence at a power level similar to other pilot-sequences.

As illustrated in FIG. 3, each traffic channel 31 and a pilot-sequence 33 are combined by multiplication with a unique PN-sequence 34. The traffic channels and the pilot-sequence are combined by addition in adder 35 and the resulting signal 36 is modulated in a modulator 37 and amplified in an amplifier 38 and is subsequently transmitted from the base station 30 through antenna 39.

Since the pilot-sequence signals are received at each mobile station along with other signals containing speech information intended for the respective mobile station and noise, each mobile station will have to use a subtraction demodulation process to sort through all of the received signals to detect and decode the desired signals. As a result, each mobile station can receive its own signal on its own frequency and simultaneously measure the signal strengths of all of the neighboring base stations on the same frequency. Furthermore, the measured signal strengths can be stored in a memory in the mobile station and updated periodically. As a result, each mobile station can send the stored base station signal strength information to their respective base stations at regular intervals or when requested to do so during Mobile Assisted Handoff.

An exemplary CDMA communication system with subtractive demodulation is disclosed in U.S. patent application Ser. No. 07/628,359, filed Dec. 17, 1990, and U.S. patent application Ser. No. 07/739,446, filed Aug. 2, 1991, which is a continuation-in-part application thereof, both of which are incorporated herein by reference. In the present system, the ability to tolerate an increased number of interfering signals to thereby achieve an increase in system capacity, is provided through the use of a subtractive demodulation process. Generally speaking, a receiver in this type of system does not operate to decode only a single desired signal in the presence of a large number of interfering signals. Rather, a number of received signals, both interfering and desired, are successively decoded in the order of their received signal strength wherein the strongest received signal is decoded first. After being decoded, each interfering signal is recorded and subtracted from the received signal, to thereby reduce the interference that is present when the desired signal is decoded.

With this approach, a larger number of signals, each having a unique PN-sequence or scrambling code to provide a means of discriminating them from one another, are permitted to overlap. In the following embodiments, either a PN-sequence or scrambling codes can be used. In some communication systems, each base station has a set of PN-sequences or scrambling codes which are assigned to mobile stations, while in other systems each mobile station has its own PN-sequence or scrambling code. The capacity of such a system is not limited by theoretical bounds, but rather by the amount of the signal processing resources that are available to demodulate a multiplicity of signals.

Subtractive demodulation will now be described in conjunction the signal graphs shown in FIGS. 4–6 which set forth example waveforms in the coding and decoding processes involved in traditional CDMA systems. Using these same waveform examples from FIGS. 4–6, the improved performance of the present invention over conventional CDMA is illustrated in FIG. 7.

Two different data streams, shown in FIG. 4 as signal graphs (a) and (d), represent digitized information to be communicated over two separate communication channels. Signal 1 is modulated using a high bit rate, digital code unique to signal 1 as shown in signal graph (b). For purposes of the present invention, the term "bit" refers to one digit of the information signal. The term "bit period" refers to the time period between the start and the finish of the bit signal. The term "chip" refers to one digit of the high rate coding signal. Accordingly, the chip period refers to the time period between the start and the finish of the chip signal. Naturally, the bit period is much greater than the chip period. The result of this modulation, which is essentially the product of the two signal waveforms, is shown in the signal graph (c). In Boolean notation, the modulation of two binary waveforms is essentially an exclusive-OR operation. A similar series of operations is carried out for signal 2 as shown in signal graphs (d)–(f). In practice, of course, many more than two coded information signals are spread across the frequency spectrum available for cellular telephone communications.

Each coded signal is used to modulate a RF carrier using any type of modulation technique, such as Quadrature Phase Shift Keying (QPSK). Each modulated carrier is transmitted over an air interface. At a radio receiver, such as a cellular base station, all of the signals that overlap in the allocated frequency bandwidth are received together. The individually coded signals are added, as represented in the signal graphs (a)–(c) of FIG. 5, to form a composite signal waveform.

After demodulation of the received signal to the appropriate baseband frequency, the decoding of the composite signal takes place. Signal 1 may be decoded or de-spread by multiplying the received composite signal in the signal graph (c) with the unique code used originally to modulate signal 1, as shown in the signal graph (d). The resulting signal is analyzed to decide the polarity (high or low, +1 or −1, "1" or "0") of each information bit period of the signal.

These decisions may be made by taking an average or majority vote of the chip polarities during one bit period. Such "hard decision" making processes are acceptable as long as there is no signal ambiguity. For example, during the first bit period in the signal graph (f), the average chip value is +0.67 which readily indicates a bit polarity +1. Similarly, in the third bit period, the average is +0.80 which indicates a bit polarity of +1. However, whenever the average is zero as illustrated in the second bit period, the majority vote or averaging test fails to provide an acceptable polarity value.

In ambiguous situations, a "soft decision" making process must be used to determine the bit polarity. For example, an analog voltage proportional to the received signal after despreading may be integrated over the number of chip periods corresponding to a single information bit. The sign or polarity of the net integration result indicates that the bit value is a +1 or −1.

The decoding of signal 2, similar to that of signal 1, is illustrated in the signal graphs (a)–(d) of FIG. 6. After decoding, there are no ambiguous bit polarity situations.

Theoretically, this decoding scheme can be used to decode every signal that makes up the composite signal. Ideally, the contribution of unwanted, interfering signals is minimized if the digital spreading codes are orthogonal to the unwanted signals. Two codes are orthogonal if exactly one half of their bits are different. Unfortunately, only a certain number of orthogonal codes exist for a finite word length. Another problem is that orthogonality can be maintained only when the relative time alignment between signals is strictly maintained. In moving constantly, such as in cellular systems, time alignment is difficult to achieve.

When code orthogonality cannot be guaranteed, noise-based signals may interfere with the actual bit sequences produced by different code generators, e.g., the mobile telephone. In comparison with the originally coded signal energies, however, the energy of the noise signals is usually small. The term "processing gain" is often used to compare relative signal energies. Processing gain is defined as the ratio of the spreading or coding chip rate to the underlying information bit rate. Thus, the processing gain is essentially the spreading ratio. For example, a one kilobit per second information rate modulated by a one megabit per second coding signal has a processing gain of 1000:1.

Large processing gains reduce the chance of decoding noise signals modulated using uncorrelated codes. For example, processing gain is used in military contexts to measure the suppression of hostile jamming signals. In other environments, such as cellular systems, processing gain refers to suppressing other, friendly signals that are present on the communication channel with an uncorrelated code. In the context of the present invention, noise includes both hostile and friendly signals. In fact, noise is defined as any other signals other than the signal of interest, i.e., the signal to be decoded. Expanding the example described above, if a signal-to-interference ratio of 10:1 is required, and the processing gain is 1000:1, conventional CDMA systems have the capacity to allow up to 101 signals to share the same channel. During decoding, 100 of the 101 signals are suppressed to 1/1000th of their original interfering power. The total interference energy is thus 100/1000 or 1/10 as compared to the desired information signal energy of one (1). With the information signal energy ten times greater than the interference energy, the information signal may be correlated accurately.

Together with the required signal-to-interference ratio, the processing gain determines the number of allowed overlapping signals in the same channel. That this is still the conventional view of the capacity limits of CDMA systems may be gleaned by reading, for example, "On the Capacity of a Cellular CDMA System," by Gilhousen, Jacobs, Viterbi, Weaver and Wheatly, *IEEE Transactions on Vehicular Technology*, May 1991.

In contrast to the conventional view, an important aspect of the present invention is the recognition that the suppression of friendly CDMA signals is not limited by the processing gain of the spread spectrum demodulator as is the case with the suppression of military type jamming signals. A large percentage of the other signals included in a received, composite signal are not unknown jamming signals or environmental noise that can not be correlated. Instead, most of the noise, as defined above, is known and is used to facilitate decoding the signal of interest. The fact that most of these noise signals are known, as are their corresponding codes, is used in the present invention to improve system capacity and the accuracy of the signal decoding process.

Rather than simply decode each information signal from the composite signal, the present invention also removes each information signal from the composite signal after it has been decoded. Those signals that remain are decoded only from the residual of the composite signal. Consequently, the existence of signal transmissions in the communications channel from the already decoded signals do not interfere with the decoding of other signals. For example, in FIG. 7, if signal 2 has already been decoded as shown in the signal graph (a), the coded form of signal 2 can be constructed as shown in the signal graphs (b) and (c) and subtracted from the composite signal in the signal graph (d) to leave coded signal 1 in the signal graph (e). Signal is recaptured easily by multiplying the coded signal 1 with code 1 to reconstruct signal 1. It is significant that had the conventional CDMA decoding method been unable to determine whether the polarity of the information bit in the second bit period of signal 1 was a +1 or a −1 in the signal graph (f) of FIG. 5, the decoding method of the present invention would effectively resolve that ambiguity simply by removing signal 2 from the composite signal.

To further facilitate an understanding of the invention, a specific example is described where a Walsh-Hadamard (128, 7) block coding technique is employed to provide channel coding and spreading in CDMA modulation. However, the principles of the present invention are not limited to communication systems which employ this encoding technique. In addition, the block codes can be either orthogonal block codes or bi-orthogonal block codes.

An overall view of a CDMA based cellular radio telephone system, of the type in which the present invention can be implemented, is illustrated in block diagram form in FIG. 8. In this Figure, a transmitter 51 and a receiver 52 are depicted in block form. The transmitter might be present at a base station of the radio telephone communications system, and the receiver could be located in a mobile unit, for example. Alternatively, the transmitter could be that of a mobile unit with the receiver located in a base station.

Referring to FIG. 8, speech which is generated by one of the participants in a telephone conversation is provided as an input signal to a speech encoder 54. The speech encoder can be a conventional encoder which converts the speech signal into a digital signal according to any of the well known types of speech digitizing algorithms. Examples of such algorithms which are employed in conventional speech encoders include Continuously Variable Slope Delta Modulation (CVSD), Adaptive Delta Pulse Code Modulation (ADPCM), Residual Excited Linear Predictive Coding (RELP) and Vector Code Book Excited Linear Predictive Coding (VSELP). The particular type of encoder that is selected in a given application will depend upon various design factors, such as the desired compromise between bit rate reduction and encoder cost and complexity.

After the speech signal has been digitized in the encoder 54 its bandwidth is expanded to produce a CDMA signal in CDMA encoder 55. In the preferred implementation, the CDMA bandwidth expansion is obtained by means of (128,7) orthogonal block encoding. In addition to block encoding the digitized speech signal with the block codes, the scrambling device 56 also scrambles the encoded signal with a unique cipher code that is assigned to the communication. The encryption can, for example, consist of the bitwise modulo-2 addition of a unique scrambling code to the block code before transmission. The selection and use of scrambling codes are described in co-pending U.S. patent application Ser. No. 07/866,865, filed on Apr. 10, 1992, for "Multiple Access Coding for Mobile Radio Communications", which is expressly incorporated here by reference. Since all communications preferably employ the same block codes to expand their bandwidth, the scrambling of the encoded signals with the unique cipher codes enables the various communications to be distinguished from one another, as described in greater detail in the previously mentioned copending patent applications which are incorporated by reference.

Once the digitized speech signal has been encoded with the block code and scrambled with the cipher code, it is passed to a parallel to serial converter 58. In this circuit, the scrambled speech signal is converted into a serial signal that is provided to a modulator 60. A carrier signal at a suitable carrier frequency $F_c$ is modulated with the scrambled speech signal, amplified in an amplifier 62, and transmitted to the receiver 52 of the other participant in the conversation.

At the receiver 52, which can be located in a mobile unit for example, the transmitted signal is received, demodulated to remove the carrier frequency in a demodulator 64, and reconverted into parallel form in a serial to parallel converter 66. The received signal is then unscrambled in a descrambling circuit 68 that is provided with the same cipher code that was used to scramble the signal. Once the signal has been unscrambled, it is provided to a Fast Walsh transform circuit 70 that determines which of the possible 128 bit orthogonal code words was transmitted. In operation, the Fast Walsh transform circuit 70 simultaneously computes the correlation of the received code word with each possible code word, and determines the code word having the highest correlation. This determination is carried out in a signal discrimination circuit 72. A Fast Walsh Transform and a Maximum Search Circuit are described in co-pending U.S. patent application Ser. No. 07/735,805, filed on Jul. 25, 1991, for "Fast Walsh Transform Processor", and U.S. patent application Ser. No. 07/761,380, filed on Sep. 18, 1991, for "Maximum Search Circuit", both of which are expressly incorporated here by reference. The signal discriminated code word is then provided to a speech decoder circuit 74, which converts it into the original speech signal. The signal strength of the received signal can be stored in a memory 76.

In addition to the desired signal pertaining to the conversation of interest, the receiver 52 also receives signals pertaining to other conversations. For example, the receiver in a mobile unit receives signal broadcast from the base station to all of the other mobile units within the cell. In essence, these other received signals constitute noise relative to the desired signal pertaining to the conversation of interest. In a preferred implementation of the present invention, these other signals are also individually descrambled and decoded, in the order of their received signal strength. Once each of these "noise" signals is determined, it can then be rescrambled and subtracted from the original received signal, to thereby reduce interfering noise and facilitate decoding of the desired signal.

Figure 9:
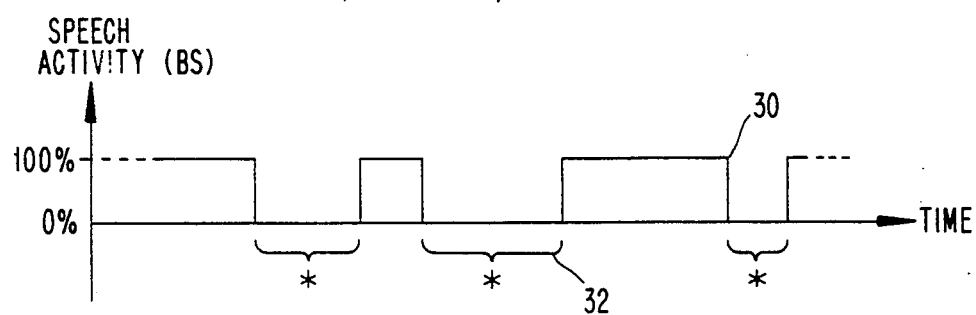
FIG. 9 illustrates typical speech activity in the present invention.

In another embodiment of the present invention, discontinuous transmission (DTX) and discontinuous reception (DRX) are used to allow a mobile station to measure the signal strength of signals on frequencies other than the frequency the mobile station is presently operating on. FIG. 9 illustrates a typical speech pattern in a communication system. As illustrated, a typical speech pattern of a telephone conversation consists of periods of speech activity 40 intermingled with periods of silence 42 or no speech activity.

Figure 10:
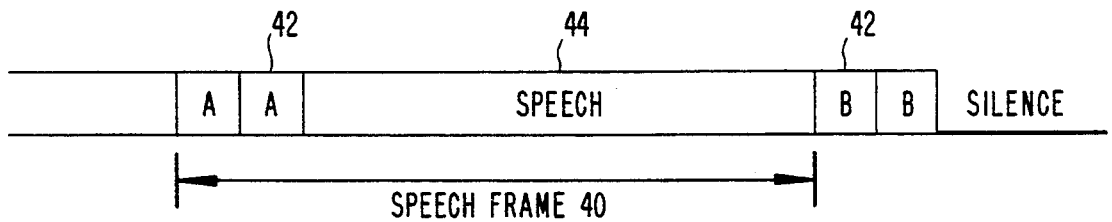
FIG. 10 illustrates a speech frame for one embodiment of the present invention.

An example of a speech frame in a communication system is illustrated in FIG. 10. At the beginning of each speech frame 45, code signals 47 called "DTX FLAGS" can be inserted before the speech information section 49 to indicated whether the rest of the speech frame contains speech information. In this example, code signals A indicate to a receiver that speech information will follow, while code signals B indicate to the receiver that the transmitter is going to discontinue transmission for the remainder of the speech frame. As a result, a receiver can discontinue processing that signal for the remainder of the speech frame and regularly measure the signal strength of neighboring base stations.

The present invention provides a communication system which utilizes "discontinuous transmission" (DTX) in a manner that enables receiver synchronization to be maintained while increasing system capacity, and is therefore particularly well suited for use in CDMA communications systems. To this end, according to one aspect of the present invention, a speech frame structure is deliberately imposed on the speech encoding method, even for those encoding methods which are inherently structureless. The speech signal is examined for the presence or absence of active speech. If no active speech is detected during the duration of an entire frame, the transmission of the frame of digitized speech code words is inhibited.

As another feature of the invention, a receiver only attempts to demodulate the received signal for a limited number of sequential code words. If the signal is not observed to reach a minimum threshold of correlation with a valid code sequence, no further attempts at demodulating that signal are carried out for the remainder of the predetermined time corresponding to the speech frame.

Further in accordance with this aspect of the invention, the speech frame structure of a multiplicity of overlapping CDMA signals transmitted from the same base station are given a fixed relative time alignment. This alignment of the signals allows mobile receivers that are decoding at least one signal to accurately anticipate when other signals, that have been temporarily silenced through discontinuous transmission, are likely to resume transmission. Thus, receiver synchronization and frame alignment information can be obtained from signals other than the specific information signal destined for the receiver.

Preferably, the time alignment relationship employs a fixed pattern of offset between the different signals. This arrangement causes the times at which the different signals can resume transmission to be evenly distributed over the period of a speech frame. Thus, the times at which the receiver attempts to demodulate the various signals is also distributed to avoid undesired peaks in receiver activity. According to a further feature of the invention, the speech frame timing for transmissions from a mobile transmitter is derived from the speech frame timing of signals it receives from the base station. Thus, the relative timing that the base station chooses for transmissions from the base stations to the mobile receiver is reflected in the relative frame timing between mobile transmissions to the base station, thereby providing the base station receiver with the benefits of staggered frame alignment. An exemplary CDMA communication system is disclosed in U.S. patent application Ser. No. 07/866,555, filed Apr. 10, 1992, entitled "Discontinuous CDMA Reception" and is incorporated herein by reference.

When a receiver receives a signal from a transmitter which indicates that the transmitter is going to discontinue transmission for the remainder of the speech frame, the receiver can change frequencies to measure the signal strength of neighboring base stations. The measured signal strengths can be stored in a memory in the mobile station and updated periodically. As a result, each mobile station can send the stored base station signal strength information to their respective base stations when requested to do so during Mobile Assisted Handoff.

While the invention has been described in its preferred embodiments, it is to be understood that the words that have been used are words of description rather than of limitation, and that changes within the purview of the present claims may be made without departing from the true scope of the invention and its broader aspects.

I claim:

1. In a multiple access, spread spectrum communication system for communication information signals, which include speech, control and pilot-sequence signals, between a plurality of base station and a plurality of mobile stations, a method comprising:
   coding blocks of bit sequences of an information signal;
   scrambling each said coded information signal using a unique selected scrambling bit sequence;
   transmitting said scrambled coded signals from each base station;
   receiving a composite signal of overlapping, transmitted signals;
   descrambling said composite signal using one of said unique scrambling bit sequences to distinguish coded information signals from a selected base station from other signals in said composite signal;
   recursively correlating said composite signal with block codes corresponding to said information signals;
   determining which block code generates a greatest correlation and producing a correlated signal;
   successively removing said correlated signal from said composite signal;
   rescrambling a residual portion of said correlated, composite signal using said corresponding block codes to generate a series of recorded signals;
   detecting received pilot-sequence signals;
   measuring the signal strength of each received pilot sequence signal; and
   storing the measured signal strengths of the received pilot sequences.

2. A method of communication in a code division multiple access system according to claim 1, further comprising the step of:
   regularly transmitting the stored signal strengths to a base station.

3. A method of communication in a code division multiple access system according to claim 1, further comprising the step of:
   transmitting the stored signal strengths to a requesting base station.

4. In a multiple access, spread spectrum communication system for communicating information signals, which include speech, control and pilot-sequence signals, between a plurality of base stations and a plurality of mobile stations, a transmitter in each base station including:
   coding means for coding blocks of bit sequences of an information signal,
   means for scrambling each information signal using a unique selected scrambling bit sequence corresponding to one of said base stations, and
   means for transmitting said block coded information signal; and
   receiving means in each mobile station for receiving a composite signal of overlapping, transmitted signals, including:
   descrambling means for descrambling said composite signal using one of said unique scrambling bit sequences to distinguish coded information signals from a selected base station from other signals in said composite signal;
   correlation means for recursively correlating said composite signal with block codes corresponding to said information signals;
   comparison means for determining a block code that generates a greatest correlation and for producing a correlated signal;
   signal removal means for successively removing said correlated signal from said composite signal;
   rescrambling means for recording a residual portion of said correlated, composite signal using said corresponding block codes to generated a series of recorded signals;
   detection means for detecting received pilot-sequences;
   measuring the relative signal strength of each received pilot sequence; and
   storing the measured signal strengths of the received pilot sequences.

5. The system according to claim 4, wherein said block codes are formed using Walsh-Hadamard matrices.

6. The system according to claim 4, wherein said block codes are orthogonal block codes.

7. The system according to claim 4, wherein said block codes are bi-orthogonal block codes.

* * * * *